United States Patent [19]

Choca et al.

[11] 4,174,301
[45] Nov. 13, 1979

[54] POLYCARBOXYLIC ACIDS AS EXTRUSION AIDS FOR SILICA-ALUMINAS

[75] Inventors: Monica E. Choca, Chicago; Gerald R. Feistel, Hinsdale, both of Ill.

[73] Assignee: Nalco Chemical Company, Oak Brook, Ill.

[21] Appl. No.: 944,838

[22] Filed: Sep. 22, 1978

Related U.S. Application Data

[63] Continuation of Ser. No. 829,541, Aug. 31, 1977, abandoned.

[51] Int. Cl.² .............................................. B01J 29/06
[52] U.S. Cl. .............................................. 252/455 R
[58] Field of Search .................................. 252/455 R

[56] References Cited

U.S. PATENT DOCUMENTS

| 3,917,808 | 11/1975 | Leach et al. | 423/626 |
| 4,036,784 | 7/1977 | Gembicki et al. | 252/465 |
| 4,102,821 | 7/1978 | Pessimisis | 252/463 |
| 4,107,087 | 8/1978 | Pessimisis | 252/455 R |

Primary Examiner—Carl F. Dees
Attorney, Agent, or Firm—John G. Premo; Robert A. Miller

[57] ABSTRACT

Silica-alumina powders can be extruded into catalyst supports having improved properties by the addition of up to 15% by weight of a polycarboxylic acid, containing 2–10 carbon atoms, based on the dry weight of the powder to the silica-alumina powders prior to extrusion. The addition of the polycarboxylic acid also increases the extrusion rate.

7 Claims, No Drawings

POLYCARBOXYLIC ACIDS AS EXTRUSION AIDS FOR SILICA-ALUMINAS

This is a continuation of application Ser. No. 829,541 filed on Aug. 31, 1977 and now abandoned.

Silica aluminas are useful materials as catalytic supports for hydrotreating catalysts, hydrocracking catalysts, demetallation catalysts and the like, in petroleum refining processes. In these particular processes, the support must normally be used as a formed particulate rather than as a powder such as is generally used in fluid cracking processes which also may utilize silica-aluminas.

It is recognized in the art that silica-aluminas are difficult to form, in comparison to hydrated alumina materials, by such inexpensive methods as extrusion. Prior art methods, such as those disclosed in U.S. Pat. No. 3,403,109 or commonly assigned pending application Ser. No. 623,825, all of which are hereinafter incorporated by reference into this specification, involve in some way precipitating the silica-alumina so as to make it more extrudable. As long as these precipitation methods lead to desirable catalytic properties in addition to satisfactory physical properties, these methods are suitable.

However, if one wants to extrude an extant silica-alumina that has otherwise desirable catalytic properties, a more general method of extrusion is desired.

It is known in the art that alumina hydrates of a certain nature, i.e. alpha alumina monohydrates, so called pseudo-boehmite are readily extrudable and give good strength by use of water as the sole extrusion aid.

The use of extrusion aids other than water for boehmitic aluminas is known in certain special circumstances. For instance, U.S. Pat. No. 3,679,605 teaches the use of starch and methyl cellulose along with polyethylene in the extrusion of a hydrated alumina containing large amounts of boehmite to make large size pores and to aid extrusion. U.S. Pat. No. 3,804,781 teaches the use of surfactants including long chain acids in the extrusion of hydrated alumina to increase porosity. U.S. Pat. No. 3,917,808 teaches the use of mixtures of polyprotic acids such as citric acid or sulfuric acid in combination with certain monoprotic acids such as hydrochloric acid or nitric acid in order to extrude a particular alpha alumina monohydrate made by a special process.

None of the aforementioned prior art patents address themselves to the extrusion of these materials which are known to be difficult to extrude and from which it is difficult to obtain good physical properties on extrusion. This invention concerns itself with materials known to be difficult to extrude. Such materials of interest are those containing alumina in calcined forms such as gamma alumina, hydrated silica aluminas, or hydrated phosphate aluminas.

We have found that polycarboxylic acids used alone, such as citric acid, provide an extrusion aid effect to allow the rapid extrusion with the obtaining of good physical properties of such difficult to extrude alumina containing bodies. Our commonly assigned application Ser. No. 672,379 filed Mar. 31, 1976, and now abandoned concerns the extrusion of materials containing calcined alumina. The object of this disclosure is to illustrate the extrusion of silica-aluminas useful in the catalyst area.

For some catalyst applications, it is desirable to increase porosity to ease the diffusion of larger molecules and thus, increase reactivity. However, very little new surface area is obtained by increasing pore volume in the large size pores and since increasing large size pores without concomitantly decreasing small size pores increases the overall pore volume, the apparent bulk density falls, and the mass of catalyst that can be loaded into a reactor falls.

On the other hand, in other catalyst applications, it is not desirable to pay the penalty of lower apparent bulk density or one does not wish to admit large molecules because they are catalyst poisons.

The process of this application is aimed at making strong extrudates of silica-alumina containing materials; the extrudates having reduced pore volume in larger pores (above 600 Å diameter). The reduction of the pore volume seems to be concomitant with increased shrinkage of the extrudate on calcination when the extrusion aids of this patent are used.

OBJECTS

It is, therefore, an object of this invention to provide a method of extruding silica-alumina in order to obtain improved rate and good compaction of the feed powder.

It is a further object of this invention to improve the physical properties of the calcined extrudates to obtain higher crush and attrition characteristics.

Other objects will appear hereinafter.

THE INVENTION

The general method employed in this invention for the preparation of a silica-alumina extrudate includes the steps of:

A. Preparing a purified silica-alumina powder comprising on a dry basis 5–60% $SiO_2$ and 40–95% $Al_2O_3$.

B. Mixing said purified silica-alumina powder with water and from 0.1–15% by weight of a water-soluble polycarboxylic acid containing from 2–10% carbon atoms based on the dry weight of the powder.

C. Adjusting the moisture content of said silica-alumina powder to an extrudable level so as to allow extrusion; and then, D. Extruding said silica-alumina powder to prepare a silica-alumina extrudate whereby the extrusion rate is improved over silica-alumina powders not so treated, and an extrudate having improved properties is obtained.

Additionally, catalyst supports can be prepared from these extrudates by the additional steps of:

A. Drying the silica-alumina extrudate, and then,

B. Calcining the dried silica-alumina extrudate whereby a catalyst support is formed.

Catalysts useful in a variety of refining operations utilizing the silica-alumina catalyst supports can also be prepared by impregnating the calcined alumina extrudates formed above with water-soluble salts of one or more catalytically active metals, drying or otherwise reducing the moisture content from the impregnation step, and then recovering a silica-alumina catalyst.

A purified silica-alumina powder is prepared by any of the standard methods known to the art. A typical preparation of such a silica-alumina powder might be as follows. A dilute solution of sodium silicate is titrated with 35% $H_2SO_4$ to an endpoint of pH 8. The resulting silica gel is mixed with the desired amount of precipitated aluminum hydroxide gel. After good mixing, the silica-alumina gel is spray dried. The spray dried powder is purified by washing and/or ion exchange. The purified powder is dried in preparation for extrusion. Although this is the possible method, the preparation and purification of the silica-alumina powder may follow any of a variety of well-known modifications to reach this point. These preparation techniques are generally known to those familiar with this art, and need not be elaborated on here. The original silica or alumina may be in the form of any soluble salt solution which gives a gelatinous precipitate on pH titration.

The silica-alumina powders useful for the practice of this invention generally comprise on a dry basis 5–60% $SiO_2$ and 40–95% $Al_2O_3$. It is seen that these figures can vary widely based on the type of supports desired and its end utility.

In any case, the purified silica-alumina powder, as is, causes some extrusion difficulties as a result of its being somewhat abrasive and difficult to compact. In accordance with our invention, the silica-alumina is mulled with an aqueous solution containing up to 0.1–15% of a polycarboxylic acid and preferably 3–7% polycarboxylic acid by weight (based on the dry weight of the silica-alumina). The moisture is then adjusted to an extrudable level, usually 45–75% by weight, and preferably between 50–70% by weight.

The polycarboxylic acids useful in the practice of this invention contain from 2–10 carbon atoms. Examples of polycarboxylic acids which are useful include; oxalic, citric, malonic, adipic, tartaric, sebacic acids, and all other carboxylic acids falling within the above terms of this invention provided they are water-soluble, aliphatic, and contain from 2–10 carbon atoms. A particularly useful polycarboxylic acid for the practice of this invention is citric acid.

The powdered material including the polycarboxylic acid of our invention can then be extruded at an improved rate yielding an extrudate having improved properties. The material after extrusion is generally predried at temperatures of from 100° to 300° F. for several hours and is then calcined at elevated temperatures generally 1,000° to 1,500° F. for several hours to form catalyst supports which are the subject of this invention. Additionally, these catalyst supports may then be impregnated with catalytically active metals and dried to form catalysts useful in a variety of refining operations.

It is interesting to note that where the prior art has recognized that shrinkage on calcination is decreased when polycarboxylic acids are used, in the practice of this invention we have actually seen an increase in the calcination shrinkage rate when catalyst supports or catalysts are prepared by the above methods. In addition, we have seen that the pore volume above 600 Å of the supports or catalysts prepared by the method of this invention is decreased relative to that where no polycarboxylic acid was used.

As an additional benefit through the practice of our invention, crush strength of the resultant catalyst supports produced in the practice of our invention generally have a minimum of a 25% increase in crush strength over materials extruded without the additives of our invention. This is important in many petroleum refining operations since the catalyst is not crushed in the bottom of a reactor by its own weight.

Silica-alumina extrudates are utilized in a variety of applications. Among their most important, however, and the one to which this invention is directly related, is the use of this type of materials as a catalyst support for materials used in petroleum refining operations. The materials prepared by the method of this invention showed utility when impregnated with catalytically active metals such as cobalt, nickel, molybdenum, and tungsten as hydrotreating catalyst for the removal of sulfur and/or nitrogen compounds from both crude and distillate fractions. The catalyst supports prepared by this invention also may find utility as cracking catalyst and catalytic supports for other hydrocarbon processing operations.

To more fully understand the nature of this invention, the following examples are given:

In the following examples, crush strength of the extrudates were determined on the side of pills of length to diameter ratio of 5:2. The attrition was determined by sieving the pills over a 20-mesh screen. 100 g of the sieved pills were tumbled for 30 minutes in a standard attrition apparatus. After tumbling, the pills were resifted over a 20-mesh screen. The amount retained on the screen expressed as a percentage of the original 100 g is the attrition resistance.

EXAMPLE I

A purified silica-alumina powder (40% $SiO_2$-60% $Al_2O_3$ on dry basis) was dried to 43% loss on ignition. Nine pounds of the dried powder (5.1 lbs. of silica-alumina solids) were charged to a Simpson muller. A solution of one liter of water containing 0.26 lbs. of citric acid (5% by weight of the silica-alumina solids) was added to the muller all at once. The material was mulled for 15 minutes. An additional 200 ml of water were added to adjust the free moisture to 51%. The free moisture was determined on an O'Haus moisture meter using 10 g of sample heated for 20 minutes at a 75 setting. The mulled material was extruded through a one-eighth inch die. The pills were broken up and predried at 250° F. for three hours and then calcined at 1,000° F. for three hours. The physical properties and pore volume of the calcined extrudates are given in Table I.

EXAMPLE II

This example serves as a comparison for Example I where another sample of the silica-alumina powder used in Example I was extruded with no citric acid. Ten pounds of the purified silica-alumina powder were charged to a Simpson muller, mulled 15 minutes with 800 ml of water and then ten minutes more with 700 ml of water to give a material having 53% free moisture. The material was extruded through a one-eighth inch die. The pills were broken, dried and calcined as in Example I. The extrusion rate of this sample was markedly slower than that of Example I.

The physical properties and pore volume of the calcined extrudate are given in Table I.

EXAMPLE III

A purified silica-alumina powder (23% $SiO_2$-76% $Al_2O_3$ on a dry basis) was dried just to an extrudable moisture. The material was extruded first through a half inch grid and then through a 0.116 inch die after adjusting to extrusion moisture. The extruded pills were predried in a programmed drier at 400° F., calcined at 800° to 1,000° F. and finally calcined at 1,250° F. All drying or calcinations were for no more than two hours.

The physical properties and pore volume of the calcined extrudate are given in Table I.

EXAMPLE IV

This example was prepared in a manner similar to Example III except 4% citric acid was added to the silica-alumina powder prior to extrusion. The extrusion rate of this material was faster than that of Example III.

The physical properties and pore volume of the calcined extrudate are given in Table I.

TABLE I
PROPERTIES OF CALCINED EXTRUDATES

| | EXAMPLE | | | |
|---|---|---|---|---|
| | I | II | III | IV |
| % Citric Acid | 5 | 0 | 0 | 4 |
| ABD[1] | 46.4 | 44.6 | 34 | 43 |
| Crush[2] | 14.7 | 6.7 | 4.8 | 13.1 |
| Attrition % | 97.7 | 94.5 | 96.5 | 99.5 |
| Pill Diameter (in.) | .112 | .115 | .108 | .098 |
| Composition % by Weight | | | | |
| $SiO_2$ | 40 | 40 | 23 | 23 |
| $Al_2O_3$ | 59 | 59 | 76 | 76 |
| $Na_2O$ | .02 | .02 | .04 | .04 |
| $SO_4$ | .44 | .44 | .25 | .25 |
| % Pore Volume in Pores >600A Diameter | 26 | 34 | 45 | 29 |
| Surface Area ($m^2/g$) BET[3] | 494.3 | 479.5 | 457.5 | 436.4 |

[1]Average bulk density in grams/ml
[2]Crush strength (lbs.)
[3]Brunnauer-Emmett-Teller method

EXAMPLE V

This example shows the use of the silica-alumina base, extruded with citric acid, as a catalytic support for hydrotreating purposes.

The ⅛" extrudates from Example IV were pore volume impregnated with a nickel-molybdenum-phosphorus solution. The solution was prepared according to the methods of U.S. Pat. No. 3,232,887. The catalyst was calcined to give a material containing 11.3% $MoO_3$, 3.84% NiO, and 4.4% $P_2O_5$ by weight. The density of the catalyst was 0.55 gm/ml.

The desulfurization and denitrogenation activity were tested as follows. Sixty milliliters of catalyst were tested for hydrotreating activity on heavy vacuum gas oil (gravity, API 20.0, boiling range 742°–1065° F.) containing 2.7% sulfur by weight, and 1562 ppm nitrogen. The run conditions were 675° F., 1,000 psig, 1.5 LHSV [volume oil/hour/volume catalyst and 4100 SCF/bbl oil of $H_2$ (100%)]. The product sulfur was 0.65% and the product nitrogen was 1063 ppm.

Having described out invention, we claim:

1. A process for preparing silica-alumina extrudates having a relatively high crush strength, relatively high shrinkage on calcination and relatively reduced pore volume in pores above 600 Å diameter consisting essentially of:
    A. Preparing a purified silica-alumina powder comprising on a dry basis 10–60% $SiO_2$ and 40–90% $Al_2O_3$;
    B. Mixing said purified silica-alumina powder with water and from 0.1–15% by weight of a water-soluble polycarboxylic acid containing from 2–10 carbon atoms based on the dry weight of the powder;
    C. Adjusting the moisture content of said silica-alumina powder to an extrudable level so as to allow extrusion; and then,
    D. Extruding said silica-alumina powder to prepare a silica-alumina extrudate whereby the extrusion rate is improved over silica-alumina powders not so treated.

2. The process of claim 1 where the polycarboxylic acid is citric acid.

3. The process of claim 1 wherein the silica-alumina extrudate is dried and calcined to prepare a catalyst support.

4. The process of claim 1 where the crush strength is increased by at least 25% over non-polycarboyxlic acid treated material.

5. The process of claim 1 where pore volume above 600 Å of the product is decreased relative to that where no polycarboxylic acid is used.

6. The process of claim 1 where the shrinkage or calcination is increased over that where no polycarboxylic acid is used.

7. A catalyst support prepared by the method of claim 1 including the additional steps of:
    A. Drying the silica-alumina extrudates to prepare a dried extrudate; and then,
    B. Calcining said dried silica-alumina extrudate whereby a catalyst support is formed.

* * * * *